United States Patent
Matsumoto et al.

(10) Patent No.: US 9,386,223 B2
(45) Date of Patent: Jul. 5, 2016

(54) IMAGE PROCESSING APPARATUS, IMAGE PROCESSING METHOD AND STORAGE MEDIUM FOR ACQUIRING AN OMNIFOCAL IMAGE BY COMBINING MULTIPLE IMAGES WITH A SPECIFIC ORDER

(71) Applicant: CASIO COMPUTER CO., LTD., Tokyo (JP)

(72) Inventors: Kosuke Matsumoto, Tokyo (JP); Hiroshi Shimizu, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 254 days.

(21) Appl. No.: 13/926,887

(22) Filed: Jun. 25, 2013

(65) Prior Publication Data
US 2014/0009572 A1    Jan. 9, 2014

(30) Foreign Application Priority Data

Jul. 5, 2012    (JP) .................................. 2012-151595

(51) Int. Cl.
*H04N 5/232*    (2006.01)
*H04N 5/235*    (2006.01)

(52) U.S. Cl.
CPC ......... *H04N 5/23238* (2013.01); *H04N 5/2356* (2013.01); *H04N 5/23212* (2013.01); *H04N 5/23232* (2013.01)

(58) Field of Classification Search
CPC ............ H04N 5/23238; H04N 5/2356; H04N 5/23212; H04N 5/23232
See application file for complete search history.

(56) References Cited

U.S. PATENT DOCUMENTS

| | | | | |
|---|---|---|---|---|
| 5,172,236 A | * | 12/1992 | Takemoto | .......... H04N 5/23212 348/355 |
| 6,538,249 B1 | * | 3/2003 | Yoshida | .................... G06T 5/50 850/10 |
| 7,006,111 B1 | * | 2/2006 | Rothrock | .............. G06T 3/4038 345/419 |

(Continued)

FOREIGN PATENT DOCUMENTS

| | | |
|---|---|---|
| JP | 2001268439 A | 9/2001 |
| JP | 2001344599 A | 12/2001 |

(Continued)

OTHER PUBLICATIONS

Korean Office Action dated May 27, 2014 issued in counterpart Korean Application No. 10-2013-0078393.

*Primary Examiner* — Jay Patel
*Assistant Examiner* — Joseph Suh
(74) *Attorney, Agent, or Firm* — Holtz, Holtz & Volek PC

(57) ABSTRACT

An imaging apparatus includes a captured image acquisition unit, a combination sequence determination unit, and an image combination unit. The captured image acquisition unit acquires data of multiple captured images that have been imaged at multiple focus positions. The combination sequence determination unit determines a sequence of the images imaged by an imaging unit, the sequence being different from both a progressive sequence of focus distances and a sequence of imaging, to be a sequence for combining the data of the multiple captured images acquired by the captured image acquisition unit. The image combination unit combines the multiple captured images imaged by the imaging unit, in the order determined by the combination sequence determination unit, creating data of an omnifocal image.

14 Claims, 10 Drawing Sheets

(56) References Cited

U.S. PATENT DOCUMENTS

| | | | |
|---|---|---|---|
| 8,184,171 B2 | 5/2012 | Tamaru | |
| 8,300,815 B2* | 10/2012 | Launay | G06Q 20/341 380/28 |
| 2001/0022860 A1* | 9/2001 | Kitamura | H04N 1/40 382/284 |
| 2002/0183618 A1* | 12/2002 | Hwang | G01S 7/52047 600/437 |
| 2003/0097063 A1* | 5/2003 | Wang | A61B 6/032 600/425 |
| 2003/0136907 A1 | 7/2003 | Takane et al. | |
| 2004/0069956 A1 | 4/2004 | Takane et al. | |
| 2005/0184237 A1 | 8/2005 | Takane et al. | |
| 2006/0158722 A1* | 7/2006 | Fujimoto | G01S 5/16 359/399 |
| 2007/0009041 A1* | 1/2007 | Wang | H04N 19/159 375/240.19 |
| 2007/0023657 A1 | 2/2007 | Takane et al. | |
| 2008/0012850 A1* | 1/2008 | Keating, III | H04N 13/0207 345/419 |
| 2008/0116376 A1 | 5/2008 | Takane et al. | |
| 2008/0259172 A1* | 10/2008 | Tamaru | H04N 5/23212 348/218.1 |
| 2008/0266440 A1* | 10/2008 | Yazdanfar | G02B 21/244 348/340 |
| 2009/0173898 A1* | 7/2009 | Kitahara | G02B 21/008 250/578.1 |
| 2010/0149363 A1* | 6/2010 | Inomata | G02B 21/367 348/222.1 |
| 2011/0032328 A1* | 2/2011 | Raveendran | H04N 13/0497 348/43 |

FOREIGN PATENT DOCUMENTS

| | | |
|---|---|---|
| JP | 2007-282152 A | 10/2007 |
| JP | 2008-271241 A | 11/2008 |

* cited by examiner

IMAGE PROCESSING APPARATUS, IMAGE PROCESSING METHOD AND STORAGE MEDIUM FOR ACQUIRING AN OMNIFOCAL IMAGE BY COMBINING MULTIPLE IMAGES WITH A SPECIFIC ORDER

This application is based on and claims the benefit of priority from Japanese Patent Application No. 2012-151595, filed on 5 Jul. 2012, the content of which is incorporated herein by reference.

BACKGROUND OF THE INVENTION

1. Field of the Invention

The present invention relates to an image processing apparatus, image processing method and storage medium that may provide an omnifocal image in which the whole image is distinct.

2. Related Art

Heretofore, when capturing an image in which respective objects are all in focus from background to foreground (hereinafter referred to as an omnifocal image), an imaging apparatus has used a special lens known as a superdepth lens (trade name: the bug's-eye lens).

However, the overall length of the bug's-eye lens is very long, which is inconvenient for carrying.

Accordingly, a technology has been disclosed, in Japanese Unexamined Patent Publication No. 2007-282152, in which an imaging apparatus at which an ordinary lens is mounted creates data of an omnifocal image from a single shutter operation, by imaging objects in the same composition at multiple focus positions at substantially the same time, and combining data of a plurality of captured images that are consequently obtained.

SUMMARY OF THE INVENTION

An imaging process apparatus according to a first aspect of the present invention includes:

an image acquisition unit that acquires data of a plurality of captured images that are imaged at a plurality of focus positions;

a sequence determination unit that determines a sequence that is different from a progressive sequence of focus distances to be a sequence of combination of the data of a plurality of captured images; and a combination unit that combines the data of the plurality of captured images in the sequence determined by the sequence determination unit and creates data of an omnifocal image.

An imaging process method according to a second aspect of the present invention includes:

an image acquisition step of acquiring data of a plurality of captured images that are imaged at a plurality of focus positions;

a sequence determination step of determining a sequence that is different from a progressive sequence of focus distances to be a sequence of combination of the data of a plurality of captured images; and a combination step of combining the data of the plurality of captured images in the sequence determined in the sequence determination step and creating data of an omnifocal image.

A non-transitory computer readable storage medium according to a third aspect of the present invention has stored therein a program causing a computer to realize:

an image acquisition function that acquires data of a plurality of captured images that are imaged at a plurality of focus positions;

a sequence determination function that determines a sequence that is different from a progressive sequence of focus distances to be a sequence of combination of the data of a plurality of captured images; and a combination function that combines the plurality of captured images in the sequence determined by the performance of the sequence determination function and creates data of an omnifocal image.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE INVENTION

First, before an embodiment of the present invention is described, an omnifocal image to be provided by the present invention is described.

It should be noted that the term "omnifocal image" as used herein does not necessarily refer only to images in which all focal distance regions are completely in focus, but encompasses images in which all focal distance regions would be distinguished as being satisfactorily in focus when viewed with the human eye.

Figure 1:
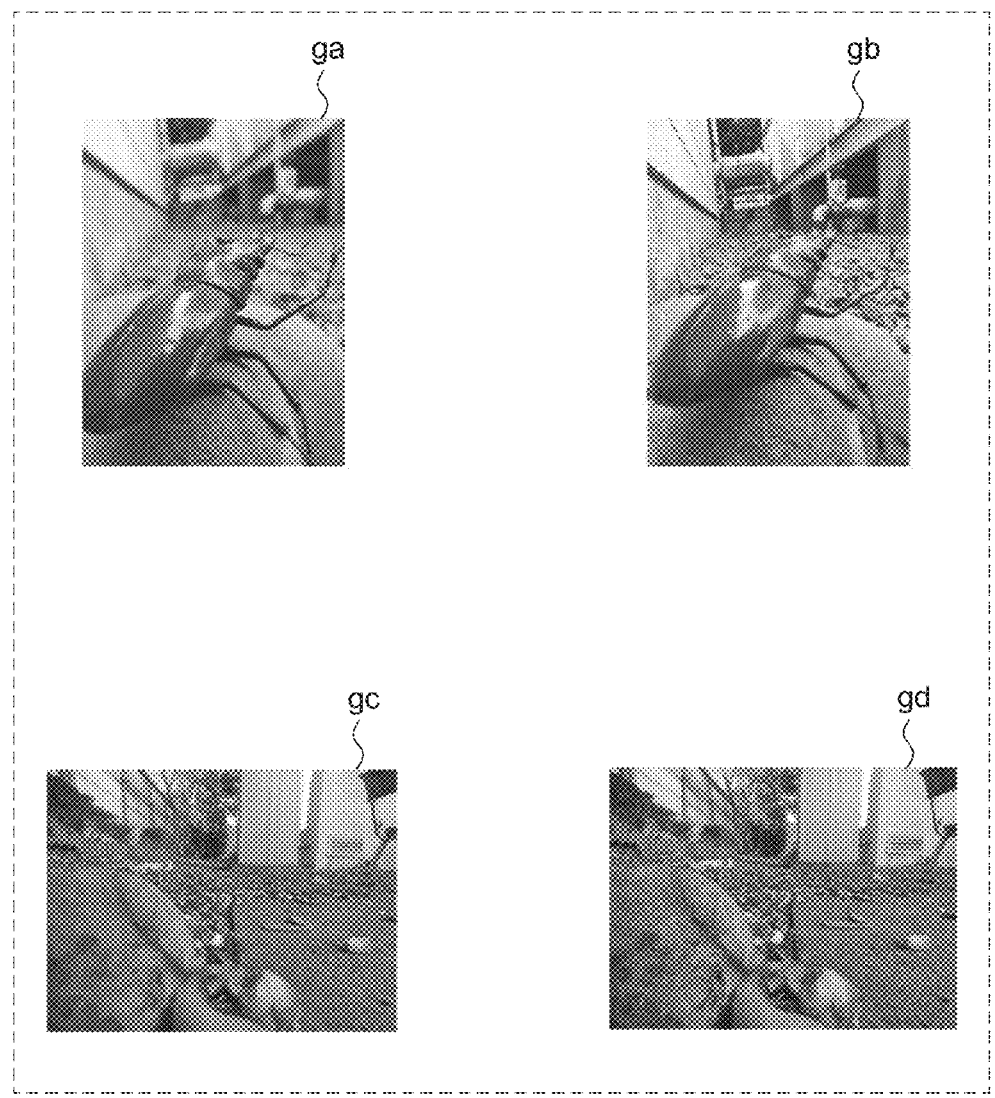
FIG. 1 is a set of schematic views for explaining omnifocal images.

FIG. 1 is a set of schematic views for explaining omnifocal images.

Image ga is an image in which a stag beetle on a rock is closer than a background, obtained as a result of imaging with the stag beetle and the rock serving as main objects and with a distant background scene included. That is, image ga is shown in FIG. 1 as an example of an image that includes a nearby main object and a background scene.

Image ga is an ordinary macro image, in which the main objects in the foreground, the stag beetle and the rock, are in focus. That is, in image ga, while the main objects in the foreground are distinct and in focus, the background scene, which is a building in this example, is not in focus but is blurred and indistinct.

In contrast, image gb is an omnifocal image obtained by combining the plurality of captured images that are imaged with the same composition as image ga. That is, image gb is shown in FIG. 1 as an example of an omnifocal image containing a nearby main object and a background scene. This image gb is an image in which the main objects, the stag beetle and the rock, and the distant background scene are both in focus. Image gb is an image such as an image captured by the bug's-eye lens, in which the field depth is large and nearby main objects can be imaged with high distinctness while a background scene is also in focus.

Image gc is obtained by imaging from close to the ground, from the same viewpoint as flower petals and a rock, which are the main objects, on the ground. That is, image gc is shown in FIG. 1 as an example of an image captured with a composition in which a main object, the rock, is in the foreground, and the other main object, the flower petals, is spread over a wide range beyond the foreground.

This image gc is an image captured by ordinary imaging, in which the further flower petals of the main objects and a building are in focus but the flower petals and rock that are the main objects in the foreground are not in focus.

In contrast, image gd is an omnifocal image obtained by combining the plurality of captured images that have been imaged with the same composition as image gc. That is, image gd is shown in FIG. 1 as an example of an omnifocal image with a composition in which the main object rock is in the foreground and the main object flower petals are spread over a wide range beyond the foreground.

This image gd is an image in which the main object rock and flower petals in the foreground, the main object flower petals that are spread into the distance, and the building are all in focus. Image gd is an image that is in focus from close distances to far distances because the field depth of the imaging is increased, to greater than a field depth that can be obtained even by "pan-focus".

As another example of an omnifocal image, different results from a usual image are created when, for example, a composition in which a main object with a small size is toward the foreground and a main object with a large size is in the distance is imaged using perspective such that the main objects are at substantially the same scale.

Specifically, a case can be mentioned in which a composition is imaged such that a building that is a distant main object is smaller than a model (a miniature) that is a foreground main object.

If an image imaged with this composition is an ordinary image, the model that is the main object in the foreground is in focus but the building that is the main object more distant than the main object model is not in focus. In such an image, because only the model in the foreground is shown distinctly, it will be apparent that the foreground main object is a model.

In contrast, an omnifocal image with the same composition is an image in which the foreground main object model and the distant main object building are in focus, so the appearance differs from the actual sizes, as in trick art. That is, this omnifocal image is an image in which an optical illusion occurs such that the small-sized main object model in the foreground appears larger than the large-sized main object building that is further away.

The Omnifocal image that may produce the effects of images as described above—for example, image captured by a bug's-eye lens, superdepth image with greater field depth than pan-focus image, images as in trick art and the like—may be easily provided without using special lenses and the like, by employing an embodiment of the present invention as described below.

Now, schematics of the present invention are described with reference to FIG. 2 and FIG. 3.

Herein, where actual images captured by an imaging apparatus 1 are to be distinguished from an omnifocal image, they are referred to as "captured images".

Figure 2:
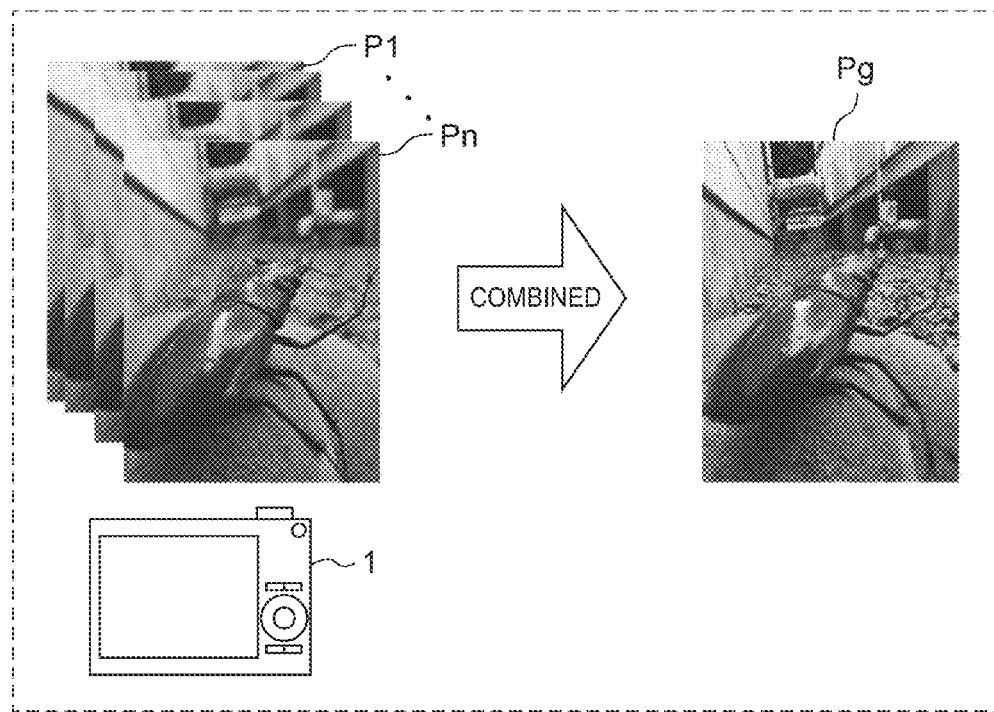
FIG. 2 is a diagram schematically illustrating the concept of a process of creating data of an omnifocal image in accordance with the present invention.

FIG. 2 is a diagram schematically illustrating the concept of a process of creating data of an omnifocal image in accordance with the present invention.

As described below, the imaging apparatus 1 serves as an embodiment of the present invention. The imaging apparatus 1 performs imaging n times (n being an integer value of at least 2) with the same composition while shifting the focus point. Thus, data of the plurality of captured images P1, ... , Pn is obtained. Hence, the imaging apparatus 1 creates data of an omnifocal image Pg by combining the data of the plurality of captured images P1 to Pn.

This data of the omnifocal image Pg may be obtained by applying a related art process for combining and creating data to the plurality of captured images P1 to Pn in the order of imaging.

However, when this related art process is applied, it is possible that image regions with false edges may be combined, and there is a risk that image data of an indistinct image in which edges are ineffective overall, that is, an image in which not all objects are in focus, may be obtained as the omnifocal image Pg.

Accordingly, the imaging apparatus 1 in which the present invention is employed applies to the combining of the plurality of captured images P1 to Pn a process (hereinafter referred to as "the combination sequence alteration process") that changes the combination sequence to a sequence such that all objects are in focus, instead of the order of imaging.

Figure 3:
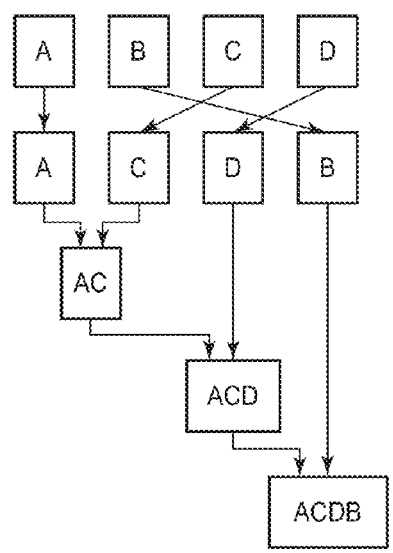
FIG. 3 is a diagram schematically describing general features of a combination sequence alteration process.

FIG. 3 is a diagram schematically describing general features of the combination sequence alteration process.

In FIG. 3, the squares represent individual images imaged by the imaging apparatus 1. The letters in the images in the drawing do not represent objects but are reference symbols indicating the sequence of imaging (the imaging order). The progress of execution of the processing goes from the top to the bottom of FIG. 3.

That is, the uppermost portion of FIG. 3 shows a state when the imaging apparatus 1 has finished imaging the captured images A, B, C, D in this order.

The imaging apparatus 1 rearranges the data of the plurality of captured images A, B, C, D to a sequence different from the imaging order and successively combines the images, as shown in FIG. 3.

Thus, the imaging apparatus 1 creates data of an omnifocal image (the image marked ACDB at the lowermost portion of FIG. 3). The omnifocal image that is obtained differs from a related art omnifocal image in which edges at which regions with false edges are combined are ineffective, being an omnifocal image in which all objects are in focus.

The method of determining the rearrangement of the data of the plurality of captured images is characterized by determination from conditions that are different from both the imaging order and a progressive sequence of focus distances of the captured images. The following process is employed in the present embodiment. First, from the data of the plurality of captured images, data of an image to be a reference for combination (hereinafter referred to as "the reference image") is specified. Then, the combination sequence is determined on the basis of differences in focus point between the reference image and the data of each other captured image.

Because the images are combined in this order, a reduction in edge strengths of a main object that is in focus in the reference image may be prevented.

Further details of this process, particularly the relationship between the determination of the combination sequence and the focus positions, are described below.

As a specific example, in the example in FIG. 3, the image group of the captured images A, B, C, D arranged in the imaging order are rearranged in accordance with the present process to an imaging group of the captured images in the sequence A, C, D, B.

Then, the data sets of the rearranged captured images are successively combined. The meaning of the term "successively combined" as used herein includes, rather than simultaneously combining data of all the captured images in the image group, combining data of the plurality of captured images one by one in accordance with the sequence, by combining data of single captured images in the image group with one another and then repeating processing in which data of a combined image is combined with data of one of the remaining captured images.

As a specific example, in the example in FIG. 3, the following sequence of processing is executed as the successive combination. Of the image group in which the captured images are rearranged into the sequence A, C, D, B, firstly the data sets of captured image A and captured image C are combined, creating data of a combined image AC. Then the data sets of combined image AC and captured image D are combined, creating data of a combined image ACD. Finally, combined image ACD and captured image B are combined, creating data of a combined image ACDB, which is the omnifocal image.

Because the present process is applied as described above, there is no need to load all the data of the captured images that are the targets of combination into memory at the same time. Therefore, a memory storage capacity may be reduced. Moreover, because the present process is applied, the data sets of the captured images are successively combined, as a result of which combined images in which edge portions are progressively being enhanced are generated. Thus, the accuracy of alignment in the combined images and the frequency with which regions that are free of false edges are combined may be raised compared to a case in which data of all images is simultaneously combined as in related art.

Herebelow, the imaging apparatus 1 in which the present process is employed, which is to say the imaging apparatus 1 in accordance with an embodiment of the present invention, is described with reference to the drawings from FIG. 4 onward.

Figure 4:
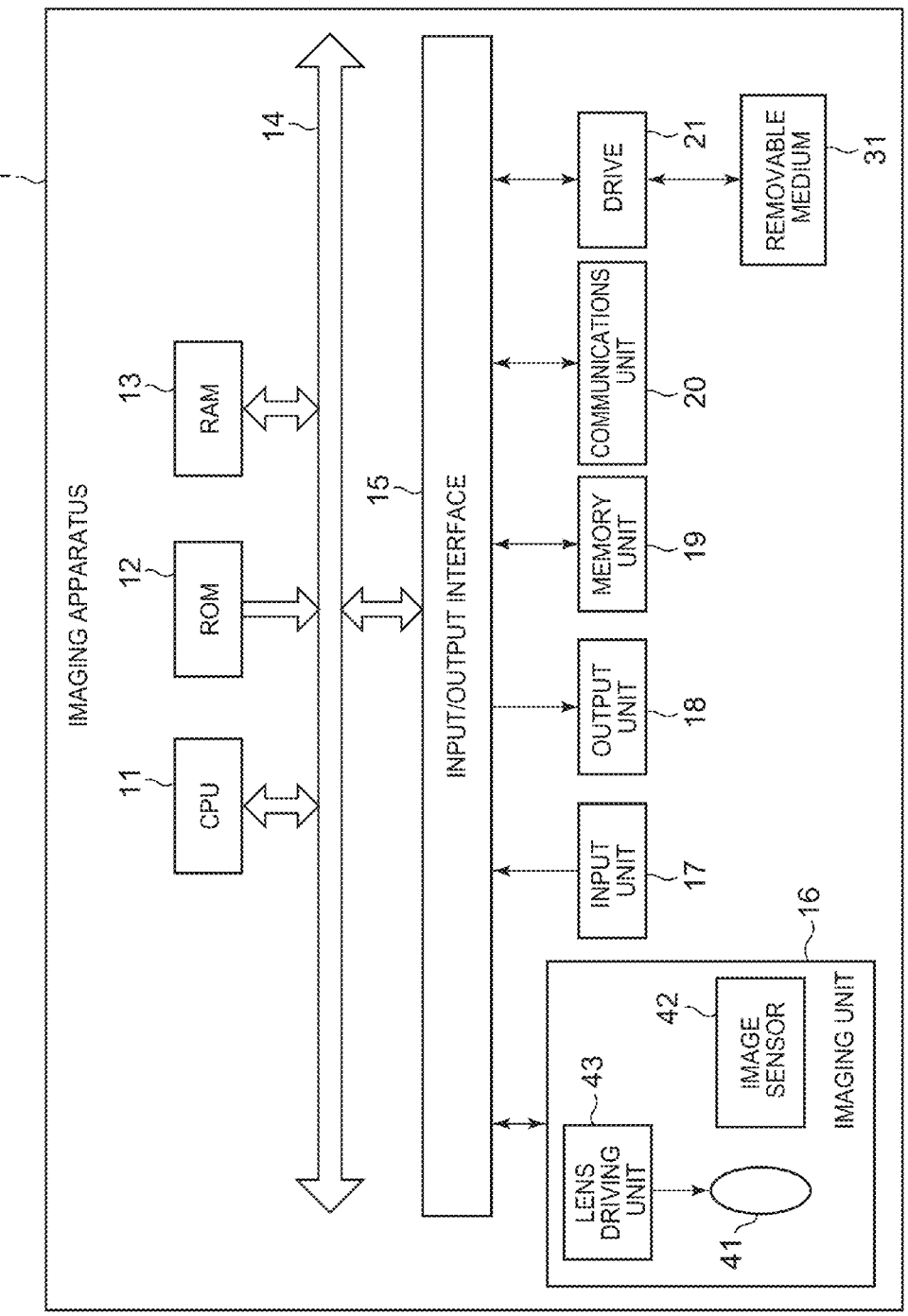
FIG. 4 is a block diagram showing hardware structures of an imaging apparatus in accordance with an embodiment of the present invention.

FIG. 4 is a block diagram showing hardware structures of an imaging apparatus 1 in accordance with the embodiment of the present invention.

The imaging apparatus 1 is configured as, as an example, a digital camera.

An imaging apparatus 1 is equipped with a central processing unit (CPU) 11, a read-only memory (ROM) 12, a random access memory (RAM) 13, a bus 14, an input/output interface 15, an imaging unit 16, an input unit 17, an output unit 18, a memory unit 19, a communications unit 20 and a media drive 21.

The CPU 11 executes various processes in accordance with a program stored in the ROM 12 or a program loaded into the RAM 13 from the memory unit 19.

Data and suchlike that is required for execution of the various processes by the CPU 11 is stored in the RAM 13 as appropriate.

The CPU 11, the ROM 12 and the RAM 13 are connected to one another via the bus 14. The input/output interface 15 is also connected to the bus 14. The imaging unit 16, the input unit 17, the output unit 18, the memory unit 19, the communications unit 20 and the drive 21 are connected to the input/output interface 15.

The imaging unit 16 is provided with an optical lens unit 41, an image sensor 42 and a lens driving unit 43.

The optical lens unit 41 is structured with various lenses, such as a focusing lens, a zoom lens and the like, for imaging objects.

The focusing lens is driven by the lens driving unit 43, which is described below, and focuses an image of an object at a light detection surface of the image sensor 42, which is described below. The zoom lens is a lens for freely varying the focusing distance within a predetermined range.

The image sensor 42 is configured with a photoelectric conversion device, an AFE (Analog Front End), and the like.

The photoelectric conversion device is configured by, for example, a CMOS-based (complementary metal oxide semiconductor) photoelectric conversion device or the like. An image of an object is incident on the photoelectric conversion device through the optical lens unit 41. The photoelectric conversion device photoelectrically converts (captures) the image of the subject, accumulates the resultant image signals for a predetermined duration, and sequentially supplies the accumulated image signals to the AFE as analog signals.

The AFE applies various kinds of signal processing such as analog-to-digital (A/D) conversion processing and the like to the analog image signals. In the AFE, the various kinds of signal processing generate digital signals, which are outputted as output signals from the imaging unit 16. The output signals of this imaging unit 16 serve as data of captured images. The data of captured images is provided to the CPU 11 and the like as appropriate. Information on the imaging sequence and information on focus positions at the moments of imaging are appended to the data of captured images as metadata. Hereinafter, except where particularly described, data of captured images with metadata appended is referred to simply as "captured image data".

The lens driving unit 43 puts an object into focus by driving the focusing lens of the optical lens unit 41 and altering the focus position on the basis of results of autofocus (AF) processing by the CPU 11.

In the imaging apparatus 1 with this focusing mechanism, both imaging in which an object toward the shortest imaging distance side, which is to say the nearward side, is in focus and imaging in which the target is an object toward infinity, that is, imaging far enough that focus adjustment is unnecessary, are possible.

The lens driving unit 43 also drives such that focus bracketing imaging, described below, is possible, in which successive images with different focus positions are captured while the focus position is altered from the position determined by the AF processing. Specifically, the lens driving unit 43 may drive the focusing lens such that, for example, the focus position is moved toward the shortest distance side from the position determined by the AF processing, and is then moved toward the infinity side. The lens driving unit 43 may also drive the focusing lens such that the focus position is moved toward the infinity side from the determined position, and then moved toward the shortest distance side. Furthermore, the lens driving unit 43 may drive so as to capture images in a sequence that gives precedence to whichever of the shortest distance side and the infinity side has a smaller movement amount of the focusing lens from the determined focus position (i.e., to the side with a smaller driving amount of the lens driving unit 43). The lens driving unit 43 may image in a sequence of the determined focus position, infinity and then other positions. In other words, the lens driving unit 43 may successively drive to specified focus positions.

The input unit 17 is constituted with various buttons and the like and inputs various kinds of information in accordance with instruction operations by a user.

The output unit 18 is structured with the display and a speaker or the like, and outputs images and sound or the like.

The memory unit 19 is structured with a hard disc, a dynamic random access memory (DRAM) or the like, and memorizes data of various images.

The communications unit 20 controls communications with other apparatuses (not shown in the drawings) over networks, including the Internet.

A removable medium 31 formed with a magnetic disk, an optical disk, a magneto-optical disk, a semiconductor memory or the like is installed in the drive 21, as appropriate. A program that is read from the removable medium 31 by the drive 21 is installed in the memory unit 19 as required. Similarly to the memory unit 19, the removable medium 31 may store the various kinds of data that are stored in the memory unit 19, such as image data and the like.

Now, of the functional structures of the imaging apparatus 1, functional structures for executing omnifocal image creation processing are described.

The meaning of the term "omnifocal image creation processing" as used herein includes a sequence of processing until data of a plurality of captured images with different focus points is combined and data of an omnifocal image is created and outputted.

Figure 5:
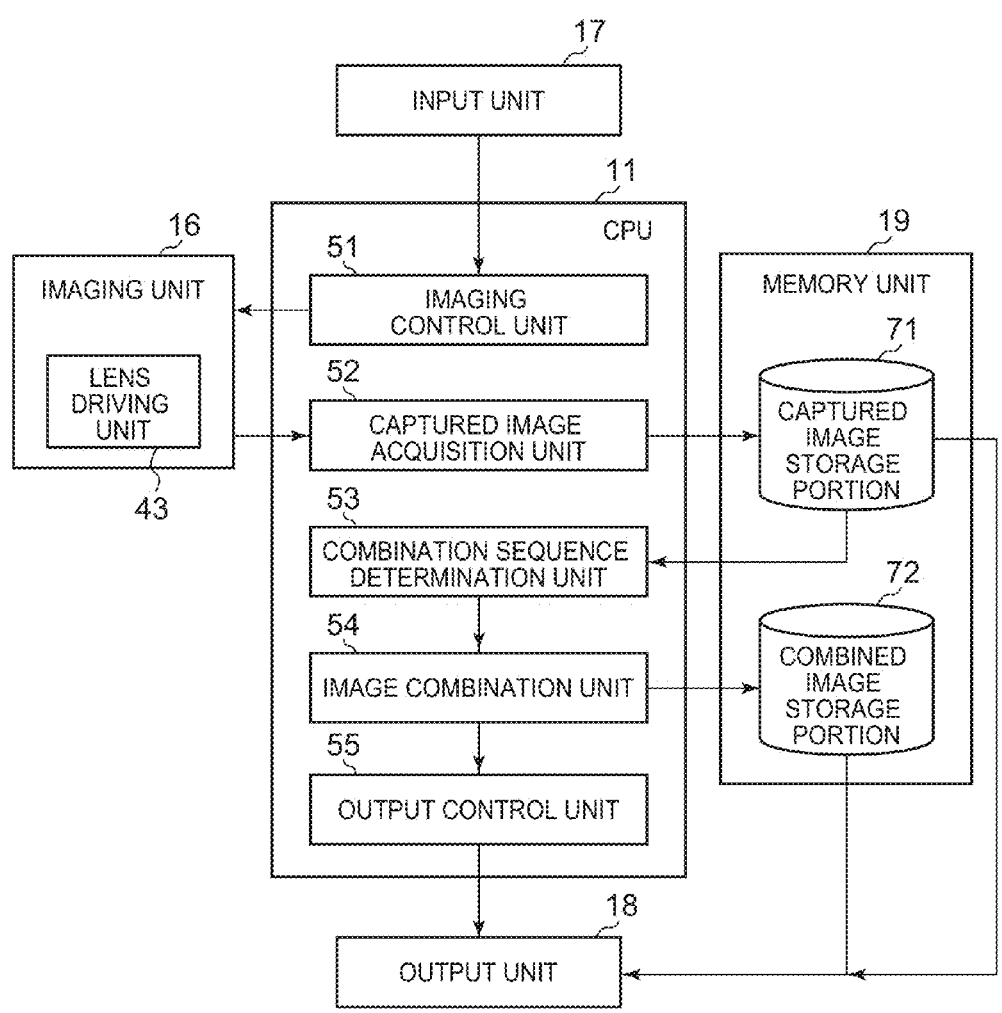
FIG. 5 is a functional block diagram showing, of functional structures of the imaging apparatus of FIG. 4, functional structures for executing omnifocal image creation processing.

FIG. 5 is a functional block diagram illustrating, of the functional structures of the imaging apparatus 1, the functional structures for executing the omnifocal image creation processing.

When the imaging apparatus 1 is executing the omnifocal image creation processing, the CPU 11 functions as an imaging control unit 51, a captured image acquisition unit 52, a combination sequence determination unit 53, an image combination unit 54 and an output control unit 55.

A region of the memory unit 19 provides a captured image storage portion 71 and a combined image storage portion 72.

The captured image storage portion 71 stores data of captured images outputted from the imaging unit 16.

The combined image storage portion 72 stores data of an omnifocal image combined by the image combination unit 54.

The imaging control unit 51 controls imaging by the imaging unit 16 including the lens driving unit 43 and the like on the basis of instructions relating to imaging from the input unit 17. Specifically, the imaging control unit 51 controls the imaging unit 16 including the lens driving unit 43 and the like so as to perform focus bracketing imaging.

The meaning of the term "focus bracketing imaging" as used herein includes a process of rapid shooting of a plurality of captured images with a single press of a shutter button of the input unit 17, at a position focused on an arbitrary object (a focus position) and each of positions to which the lens driving unit 43 drives for adjustments to shift the focus position forward and backward (to focus positions that are offset from that focus position).

The captured image acquisition unit 52 acquires captured image data outputted from the imaging unit 16.

Specifically, the captured image acquisition unit 52 acquires data of the plurality of captured images sequentially outputted from the imaging unit 16 in accordance with the focus bracketing imaging, which is to say data of a captured image imaged at a position at which a main object arbitrarily selected by a user is in focus (hereinafter referred to as "the main object focus image") and data of a plurality of captured images imaged with the focus point shifted to positions in front of and behind that position.

In the present embodiment, the captured image acquisition unit 52 acquires data of a total of five captured images: one main object focus image and four captured images imaged with the respective focus positions offset to four positions in front of and behind the position of the main object focus image.

At this time, the captured image acquisition unit 52 outputs the data of the plurality of captured images to the captured image storage portion 71 to be memorized in order of imaging.

The combination sequence determination unit 53 executes combination sequence determination processing in accordance with the data of the plurality of captured images acquired by the captured image acquisition unit 52.

This "combination sequence determination processing" is a sequence of processing that determines a sequence of combination on the basis of the imaging sequence and focus positions of the acquired data of the plurality of captured images in order to create data of an omnifocal image with high precision.

The combination sequence determination unit 53 selects the data of the captured image that is earliest in the combination sequence to be reference image data.

The image combination unit 54 successively combines the data of the plurality of captured images acquired by the captured image acquisition unit 52 in accordance with the combination sequence determined by the combination sequence determination unit 53. Specifically, the image combination unit 54 combines data of one captured image with data of another captured image, then combines a combined image created as a result thereof with data of yet another captured image, and by repeating this processing, creates data of an omnifocal image. The image combination unit 54 stores the omnifocal image data in the combined image storage portion 72.

During the successive combining, the image combination unit 54 makes distinctions as to whether or not data of a captured image is suitable for combination, that is, whether or not the data of the captured image is suitable for creating the omnifocal image data. Data of a captured image that is distinguished to be unsuitable is excluded from targets of the successive combining.

After the data of the omnifocal image has been created, the image combination unit 54 also makes a distinction as to whether or not the omnifocal image is suitable, and if it is distinguished to be unsuitable, the image combination unit 54 prohibits storage of this omnifocal image data in the combined image storage portion 72.

Specific distinctions of the suitability of data by the image combination unit 54 are described below.

The output control unit 55 controls display and output through the output unit 18 of the omnifocal image data created by the image combination unit 54.

More specifically, if it is distinguished by the image combination unit 54 that the omnifocal image data is suitable, the output control unit 55 reads the omnifocal image data stored in the combined image storage portion 72 and performs control such that the omnifocal image is displayed at a display unit of the output unit 18.

On the other hand, if storage of the omnifocal image data to the combined image storage portion 72 is prohibited because the created omnifocal image data is determined to be unsuitable by the image combination unit 54, the output control unit 55 performs control such that data of a single image among the plural captured images stored in the captured image storage portion 71, for example, the reference image data, is displayed and outputted through the output unit 18.

Functional structures of the combination sequence determination unit 53 and the image combination unit 54 are described in further detail herebelow.

Figure 6:
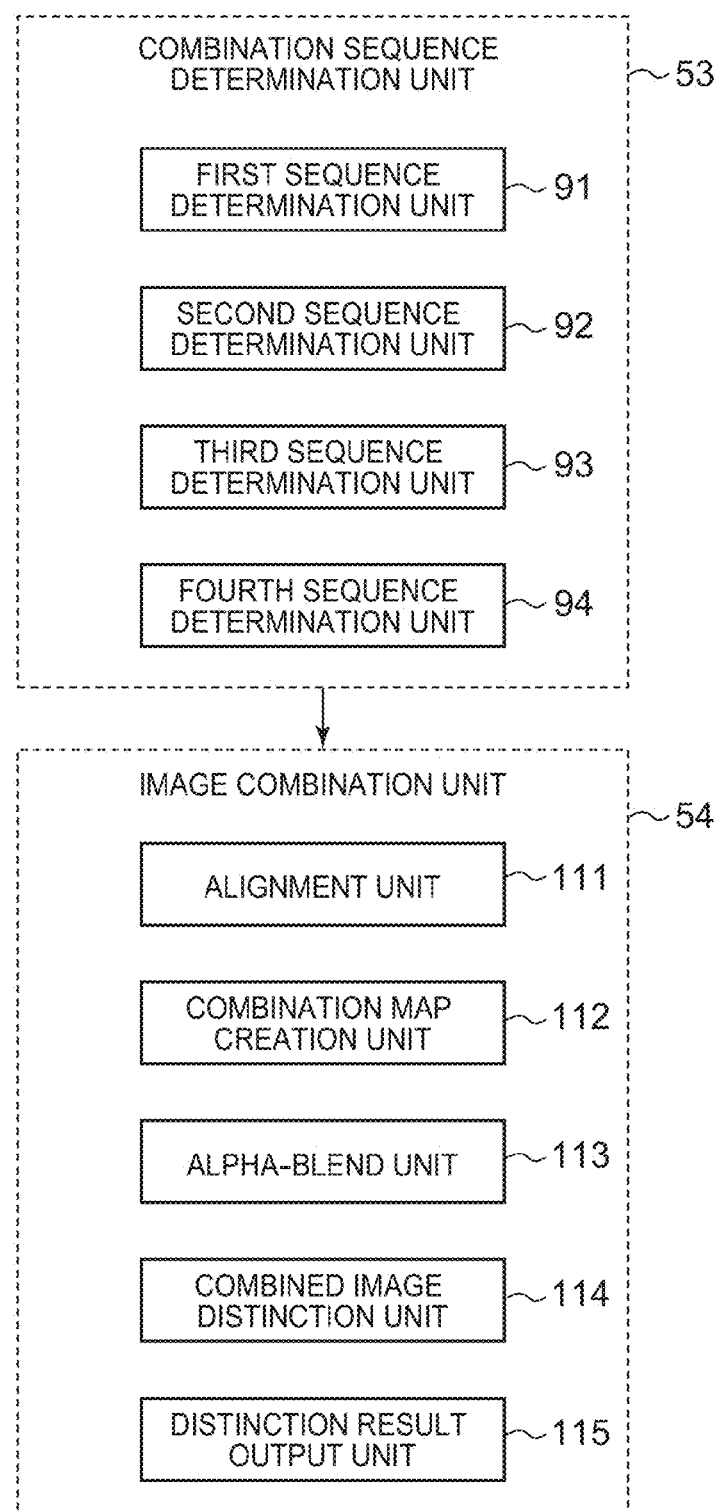
FIG. 6 is a functional block diagram showing in detail, of the functional structures of the imaging apparatus of FIG. 5, functional structures of a combination sequence determination unit and an image combination unit.

FIG. 6 is a functional block diagram showing in detail, of the functional structures of the imaging apparatus 1 in FIG. 5, the functional structures of the combination sequence determination unit 53 and the image combination unit 54.

When the combination sequence determination processing is being executed, the combination sequence determination unit 53 of the CPU 11 functions as a first sequence determination unit 91, a second sequence determination unit 92, a third sequence determination unit 93 and a fourth sequence determination unit 94.

The first sequence determination unit 91 determines a first sequence from the acquired data of the plurality of captured images.

The term "first sequence" refers to a sequence placing that is determined for the captured image data captured at the focus position arbitrarily determined by the user, that is, the data of the main object focus image. Herein, the term "Kth sequence" (K being an integer value of at least 1, in this case, each integer value from 1 to 4) refers to a group of captured images to be combined Kth in order, and is a sequence that includes a combination sequence of the plurality of images within the group. In the present embodiment, the imaging apparatus 1 images with autofocus.

Accordingly, the first sequence determination unit 91 selects the data of the captured image that was imaged first (the main object focus image) for the first sequence in the image combining. If the user operates the input unit 17 (see FIG. 4) to perform focusing manually, the data of the main object focus image is arbitrarily selected by the user, and this data becomes the first sequence.

The second sequence determination unit 92 selects a second sequence from the acquired data of the plurality of captured images.

The term "second sequence" refers to a sequence that is determined for data of one or a plurality of captured images for which the focus point is at the near side relative to the data of the main object focus image selected for the first sequence. That is, the second sequence is a sequence determined for the data of each captured image in which the value of the focus position is higher (closer) than in the main object focus image data selected for the first sequence.

The second sequence determination unit 92 determines sequence placings from a second sequence placing onward for the data of the images selected as the second sequence, in descending order of closeness to the focus point of the main object focus image in the first sequence.

The third sequence determination unit 93 selects a third sequence from the acquired data of the plurality of captured images.

The term "third sequence" refers to a sequence that is determined for data of one or a plurality of captured images for which the focus point is at the far side relative to the data of the main object focus image selected for the first sequence.

That is, the third sequence is a sequence determined for the data of each captured image in which the value of the focus position is lower (further) than in the main object focus image data selected for the first sequence.

The third sequence determination unit 93 determines sequence placings, subsequent to the sequence placings selected for the second sequence, for the data of the images selected as the third sequence, in descending order of closeness to the focus point of the image in the first sequence. For example, if the sequence placings selected for the second sequence reach the third sequence placing, the third sequence determination unit 93 determines sequence placings after the third sequence placing.

The fourth sequence determination unit 94 selects a fourth sequence from the acquired data of the plurality of captured images.

Among the acquired data of the plurality of captured images, the term "fourth sequence" refers to a sequence that is determined for a captured image imaged at infinity. That is, the fourth sequence is a sequence for which the data of the captured image in which the value of the focus position is lowest (furthest) is selected. For example, if the sequence placings selected for the third sequence reach the sixth sequence placing, the fourth sequence determination unit 94 determines the seventh sequence placing, which is the last combination.

Now, a concrete example of the combination sequence alteration process is described.

Figure 7:
FIG. 7 is a schematic diagram showing an example of the combination sequence alteration process.

FIG. 7 is a schematic diagram showing an example of the combination sequence alteration process.

In the example in FIG. 7, the imaging apparatus 1 first images one captured image with autofocus, and then images six captured images at different focus positions, imaging a total of seven captured images.

Here, the respective captured image names Img_capt[0] to Img_capt[6], matching the imaging order, are applied to the data of the captured images.

The respective focus positions of the captured image data are as follows. The focus position is 40 for captured image Img_capt[0]. The focus position is 20 for captured image Img_capt[1], the focus position is 30 for captured image Img_capt[2], the focus position is 0 for captured image Img_capt[3], the focus position is 50 for captured image Img_capt[4], the focus position is 70 for captured image Img_capt[5], and the focus position is 90 for captured image Img_capt[6].

The focus position values progressively decrease as the focusing point gets further away, with the focus position being 100 when the focus point is nearest, and the focus position ultimately being 0 when the focus point is at infinity.

The combination sequence determination unit 53 determines the combination sequence for the data of these captured images Img_capt[0] to Img_capt[6].

The first sequence determination unit 91 selects the data of the captured image Img_capt[0], which is earliest in the imaging order, to be the first sequence (in the first sequence placing).

For the second sequence, the second sequence determination unit 92 selects the data of captured images with higher (closer) focus position values than the focus position 40 of the captured image Img_capt[0] of the first sequence. In the example in FIG. 7, the second sequence determination unit 92 specifies the respective data of captured image Img_capt[4] (focus position 50), captured image Img_capt[5] (focus position 70) and captured image Img_capt[6] (focus position 90) as the second sequence. Then, the second sequence determination unit 92 individually sequences the data of the plurality of captured images in the second sequence, determining the sequence in descending order of closeness of the focus position value to the focus position 40 of captured image Img_capt[0] of the first sequence. That is, the second sequence determination unit 92 sets the sequence such that the data of captured image Img_capt[4] (focus position 50) is in the second sequence placing, the data of captured image Img_capt[5] (focus position 70) is in the third sequence placing, and the data of captured image Img_capt[6] (focus position 90) is in the fourth sequence placing, respectively.

For the third sequence, the third sequence determination unit 93 selects the data of captured images with lower (further) focus position values than the data of the captured image Img_capt[0] (focus position 40) of the first sequence. In the example in FIG. 7, the third sequence determination unit 93 specifies the respective data of captured image Img_capt[1] (focus position 20) and captured image Img_capt[2] (focus position 30) as the third sequence. Then, the third sequence determination unit 93 individually sequences the data of the plurality of captured images in the third sequence, determining the sequence in descending order of closeness of the focus position value to the focus position 40 of captured image Img_capt[0] of the first sequence. That is, the third sequence determination unit 93 sets the sequence such that the data of captured image Img_capt[2] (focus position 30) is in the fifth sequence placing and the data of captured image Img_capt[1] (focus position 20) is in the sixth sequence placing, respectively.

The fourth sequence determination unit 94 selects the data of the captured image Img_capt[1] (focus position 0), which is the furthest, at infinity, to be the fourth sequence. That is, the fourth sequence determination unit 97 sets the data of captured image Img_capt[1] to the seventh sequence placing.

Returning to FIG. 6, when the imaging apparatus 1 is executing the image combination processing, the image combination unit 54 of the CPU 11 functions as an alignment unit 111, a combination map creation unit 112, an alpha-blend unit 113, a combined image distinction unit 114 and an distinction result output unit 115.

The alignment unit 111 aligns positions of the data of each combination target captured image in accordance with the combination sequence determined by the combination sequence determination unit 53.

Specifically, the alignment unit 111 first aligns the data of the captured image that is the main object focus image selected for the first sequence placing by the combination sequence determination unit 53 with the data of the captured image in the second sequence placing. At this time, the alignment unit 111 makes a distinction as to whether combination will be successful, by making a distinction as to whether or not a positional offset at the time of combination exceeds a pre-specified threshold. If alignment is not possible, the alignment unit 111 performs alignment using the data of the next captured image in the sequence.

The combination map creation unit 112 creates combination maps from distributions of edge strengths in the aligned data of captured images and combined images. In the present embodiment, a "depth map" in which depths of objects in the captured images are distributed is employed as the combination map.

In the specific case, the combination map creation unit 112 creates a distribution map from distributions of edge strengths in the data of the captured image that is the main object focus image selected for the first sequence placing by the combination sequence determination unit 53 and in the captured image aligned therewith. At this time, the combination map creation unit 112 makes a determination from the combination map as to whether an area to be combined contains a moving object and suchlike, and makes a determination as to whether combination is suitable or not. Specifically, if the combination map creation unit 112 determines that there is a moving object or that an area to be combined is very small or suchlike, then rather than using the captured image and combined image that are the targets of creation of the combination map as the next combination targets, the combination map creation unit 112 reports this result to the alignment unit 111. Accordingly, the alignment unit 111 performs the alignment again with the next captured image in the sequence, and the combination map creation unit 112 creates a new combination map.

The alpha-blend unit 113 performs "alpha-blending" in which the data of the captured image or combined image that is the basis of combination and the data of the aligned captured image are made semi-transparent and combined in accordance with coefficients (alpha values) found on the basis of the combination map.

Specifically, the alpha-blend unit 113 creates data of a combined image by alpha-blending the data of the captured image that is the main object focus image selected for the first sequence placing by the combination sequence determination unit 53 with the data of the captured image that is aligned therewith.

Thereafter, the data of the combined image created in the preceding combination becomes a target of combination with the data of the next captured image in the sequence, the above-described processing by the alignment unit 111, the combination map creation unit 112 and the alpha-blend unit 113 is executed for this sequence placing, and data of a new combined image is created.

That is, the above-described processing by the alignment unit 111, the combination map creation unit 112 and the alpha-blend unit 113 serves as a sequence of processing, and the successive combinations are implemented by repeatedly executing this sequence of processing.

The combined image distinction unit 114 makes a distinction as to whether the omnifocal image data that is ultimately created as a result of the successive combinations is suitable. In the present embodiment, the combined image distinction unit 114 makes this distinction on the basis of whether or not the captured image at infinity has been combined and whether or not the combined image is constituted by a number of images that is at least a predetermined number.

The distinction result output unit 115 outputs the result of the distinction by the combined image distinction unit 114 of whether the image combination is suitable or not.

Now, the flow of the omnifocal image creation processing that is executed by the imaging apparatus 1 with this functional structure is described.

Figure 8:
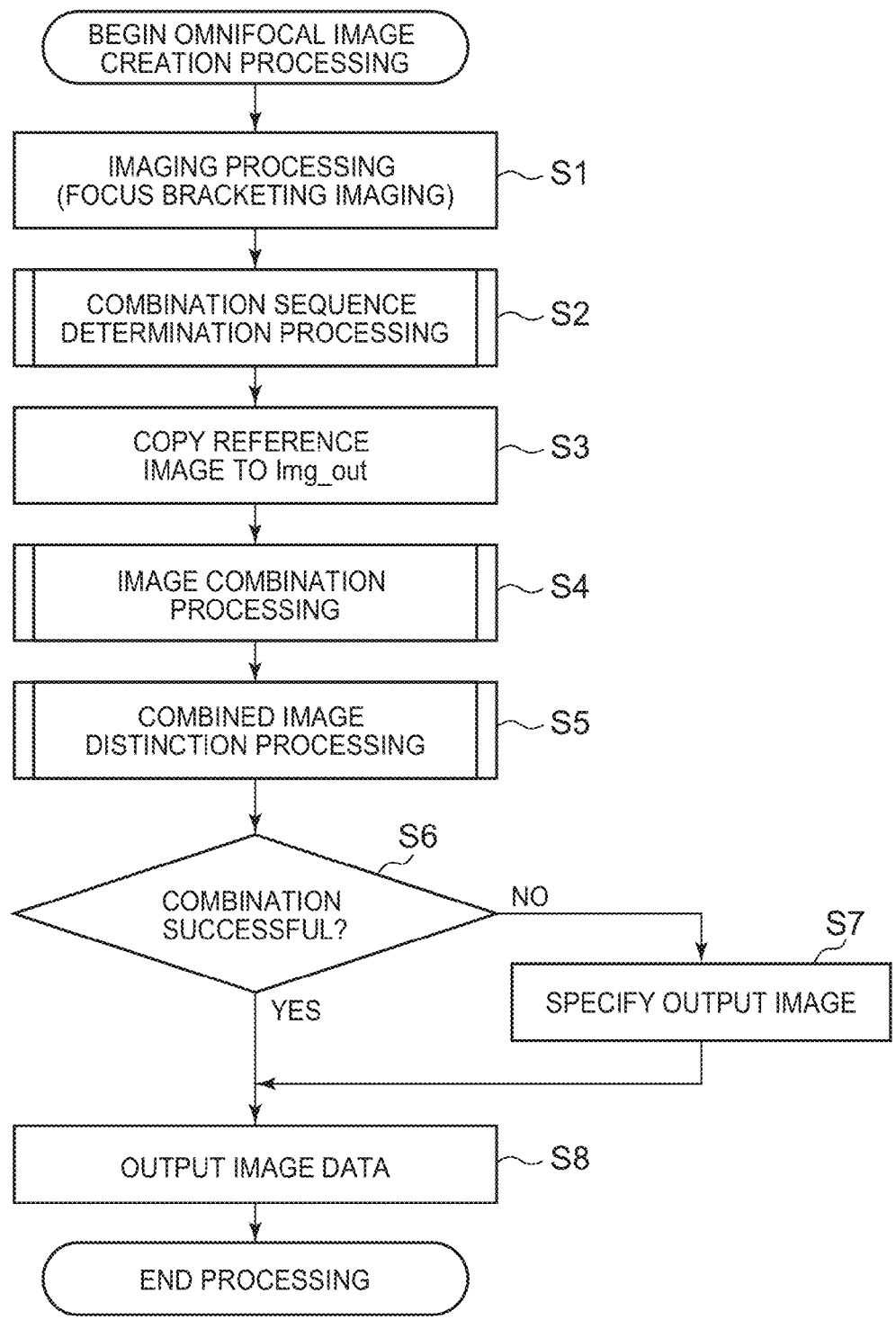
FIG. 8 is a flowchart describing the flow of omnifocal image creation processing executed by the imaging apparatus of FIG. 1 with the functional structures of FIG. 5.

FIG. 8 is a flowchart describing the flow of the omnifocal image creation processing executed by the imaging apparatus 1 of FIG. 1 with the functional structures of FIG. 5.

The meaning of the term "omnifocal image creation processing" as used herein includes a sequence of processing until data of a plurality of captured images with different focus points is combined and data of an omnifocal image is created.

When the user uses the input unit 17 to perform an operation for executing the omnifocal image creation processing, the start of the omnifocal image creation processing is initiated by this operation.

In step S1, the imaging control unit 51 controls the imaging unit 16 to perform the imaging processing (focus bracketing imaging). That is, the imaging control unit 51 performs control such that the imaging unit 16 images the plurality of captured images with different focus positions. The captured image acquisition unit 52 successively acquires the data of the plurality of captured images, which are successively outputted from the imaging unit 16, and stores the data at the captured image storage portion 71. In the present embodiment, the captured image acquisition unit 52 sequentially acquires data of a total of seven captured images, one captured image that is imaged at a position at which an object arbitrarily selected by the user is in focus, and six captured images that are imaged with the focus position shifted to positions in front of and behind the position at which the object is in focus.

In step S2, the combination sequence determination unit 53 performs the combination sequence determination processing.

This combination sequence determination processing refers to a sequence of processing in which a sequence for combining captured images is determined for the data set of captured images imaged in step S1.

In step S3, the combination sequence determination unit 53 copies the reference image to Img_out, which is an output image storage memory. More specifically, the combination sequence determination unit 53 determines that the captured image that is imaged at the position at which the object arbitrarily selected by the user is in focus (the main object focus image) is to be the reference image, and stores a copy of the data of the reference image in an output image storage memory (in the present embodiment, Img_out).

In step S4, the image combination unit 54 carries out the image combination processing.

This image combination processing refers to a sequence of processing that successively combines the respective data of the captured images in accordance with the combination sequence determined in the combination sequence determination processing of step S2, to create data of a combined image.

In step S5, the combined image distinction unit 114 carries out the combined image distinction processing.

This combined image distinction processing refers to a sequence of processing that makes a distinction as to whether the data of the omnifocal image created by the image combination processing of step S4 is suitable.

In step S6, the output control unit 55 makes a determination as to whether the combining has been successful. More specifically, the output control unit 55 makes a determination as to whether the combining of the data of the captured images has succeeded from the combined image distinction processing of step S5.

If it is determined that the combining of the data of the captured images has failed, the result of the determination in step S6 is negative and the processing advances to step S7.

In step S7, the output control unit 55 specifies an output image. More specifically, because the output control unit 55 has determined in step S5 that the combining of the data of the captured images has failed, the omnifocal image data is not suitable. Accordingly, the reference image is specified to be a display target instead. Hence, the processing advances to step S8.

On the other hand, if it is determined that the combining of the captured images has succeeded, the result of the determination in step S6 is affirmative and the processing advances to step S8.

In step S8, the output control unit 55 displays and outputs the output image data through the output unit 18.

Figure 9:
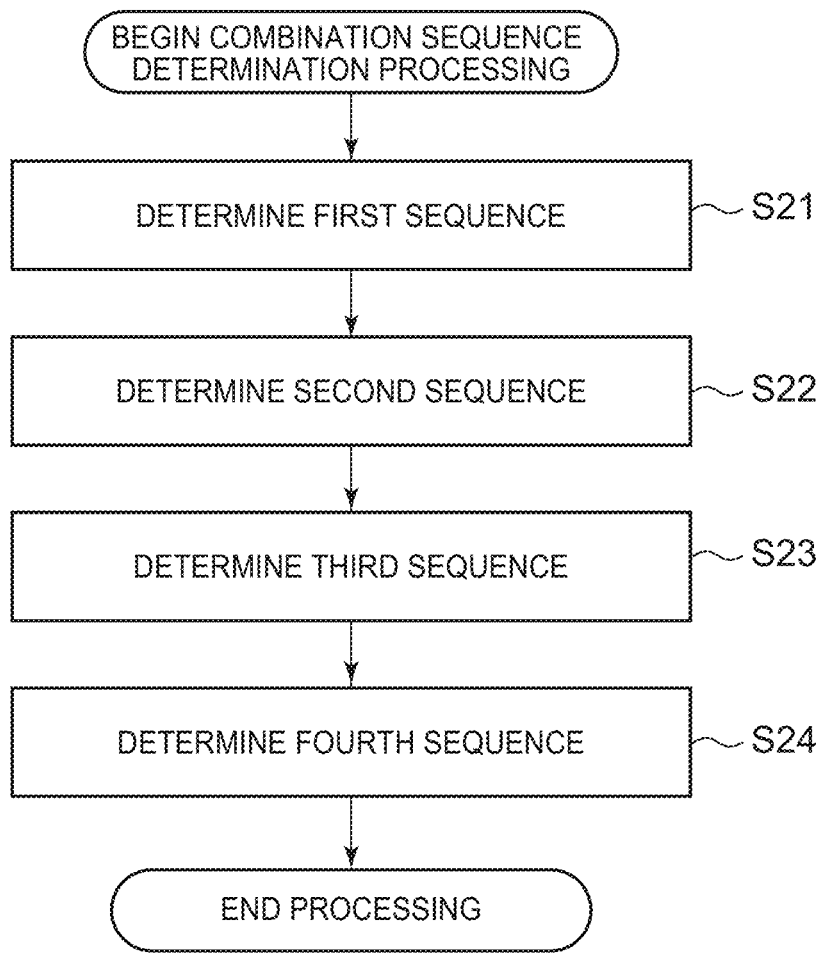
FIG. 9 is a flowchart describing details of the flow of combination sequence determination processing in step S2 of the omnifocal image creation processing of FIG. 8.

Now, of the omnifocal image creation processing in step S8, detailed flow of the combination sequence determination processing of step S2 is described. FIG. 9 is a flowchart describing the detailed flow of the combination sequence determination processing in step S2 of the omnifocal image creation processing of FIG. 8.

In step S21, the first sequence determination unit 91 determines the first sequence of the image combination on the basis of the information of the imaging sequence and focus positions.

As illustrated in the example in FIG. 7, the first sequence determination unit 91 selects Img_capt[0], the first image in the imaging sequence, to be the image of the first sequence.

In step S22, the second sequence determination unit 92 determines the second sequence of the image combination on the basis of the information of the imaging sequence and focus positions.

As illustrated in the example in FIG. 7, the second sequence determination unit 92 selects Img_capt[4] (focus position 50) to be second, Img_capt[5] (focus position 70) to be third and Img_capt[6] (focus position 90) to be fourth.

In step S23, the third sequence determination unit 93 determines the third sequence of the image combination on the basis of the information of the imaging sequence and focus positions.

As illustrated in the example in FIG. 7, the third sequence determination unit 93 selects Img_capt[2] (focus position 30) to be fifth and Img_capt[1] (focus position 20) to be sixth.

In step S24, the fourth sequence determination unit 94 determines the fourth sequence of the image combination on the basis of the information of the imaging sequence and focus positions.

As illustrated in the example in FIG. 7, the fourth sequence determination unit 94 selects Img_capt[3] to be seventh.

Thereafter, the combination sequence determination processing ends.

Now, of the omnifocal image creation processing in step S8, detailed flow of the image combination processing of step S4 is described.

Figure 10:
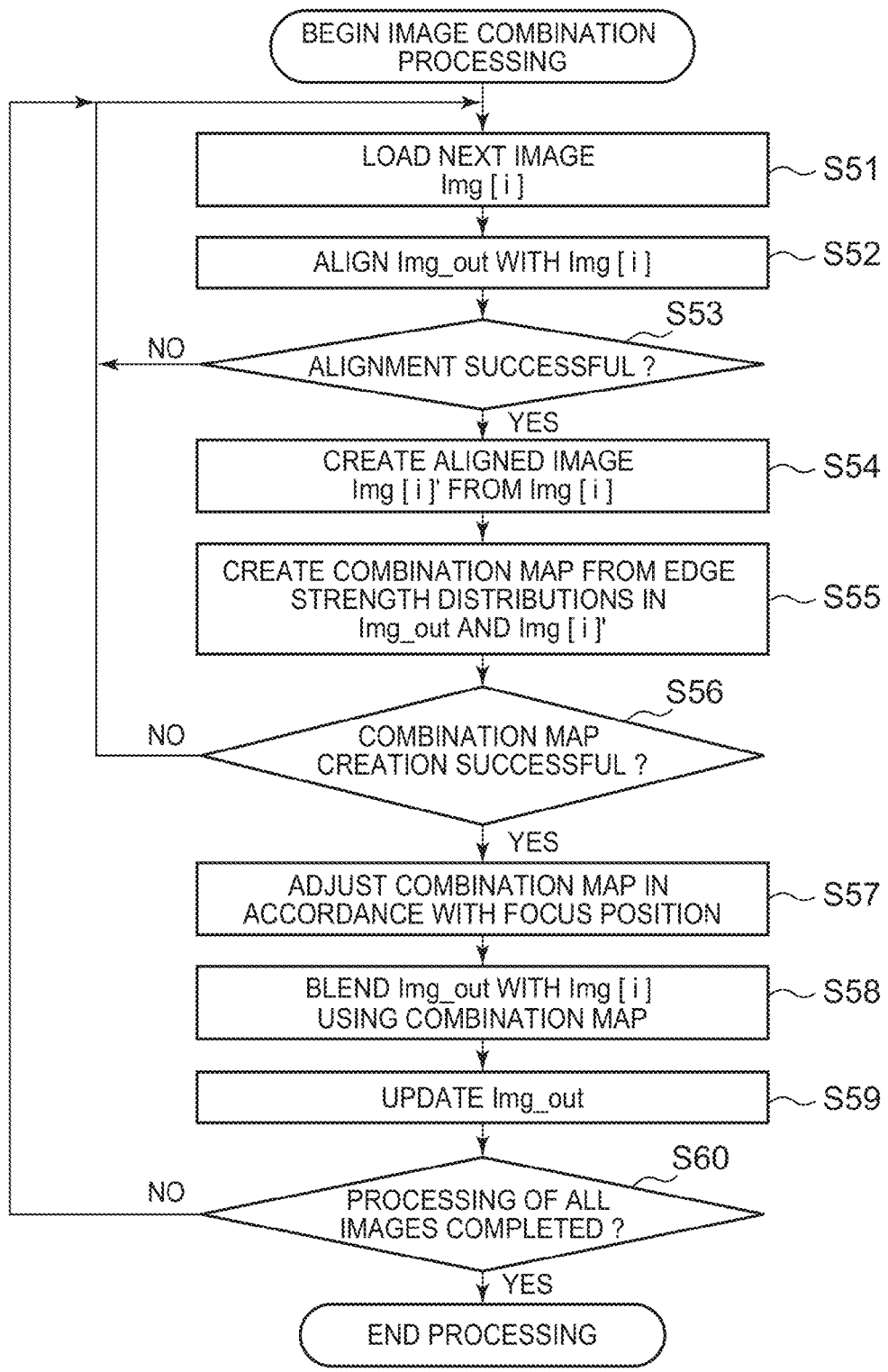
FIG. 10 is a flowchart describing details of the flow of image combination processing in step S4 of the omnifocal image creation processing of FIG. 8.

FIG. 10 is a flowchart describing the detailed flow of the image combination processing in step S4 of the omnifocal image creation processing of FIG. 8.

In step S51, the image combination unit 54 loads a sequence image to be combined (Img[i]) into a memory region.

In step S52, the alignment unit 111 aligns the reference image (or a combined image) loaded in the output image storage memory (Img_out) with the sequence image to be combined (Img[i]).

That is, characteristic points of respective pixels in the images are calculated, and the images are aligned using these characteristic points. Specific methods of calculating characteristic points from pixels are widely known so are not described here.

In step S53, the alignment unit 111 makes a determination as to whether the alignment of the reference image (or combined image) with the sequence image to be combined (Img[i]) is successful. More specifically, the alignment unit 111 makes a distinction as to whether the alignment has succeeded by making a distinction as to whether a positional offset at the time of combination exceeds the pre-specified threshold.

If it is distinguished that the alignment is a failure, the result of the distinction in step S53 is negative, the processing returns to step S51, and the subsequent processing is repeated.

If it is distinguished that the alignment is successful, the result of the distinction in step S53 is affirmative and the processing advances to step S54.

In step S54, the alignment unit 111 changes the position of the sequence image to be combined to the position of alignment from step S53, creating an image Img[i]'.

In step S55, the combination map creation unit 112 creates a combination map (in the present embodiment, a depth map) from distributions of edge strengths in the two aligned images Img_out and Img[i]'.

The term "combination map" as used here refers to a map of multiple values with object regions being at 255 and non-object regions being at 0. The combination map may be created by comparing edge strengths at respective pixels in the image that is focused on an object region and the image that is focused on a non-object region, and calculating probabilities (likelihoods of being in the object region) from spatial density distributions of the results of these edge comparisons.

In step S56, the combination map creation unit 112 makes a distinction as to whether the creation of the combination map is successful. That is, the combination map creation unit 112 specifies the presence of moving objects, the amount of area to be combined and suchlike from the created combination map, and distinguishes whether combination is suitable or not. Specifically, if the combination map creation unit 112 distinguishes that there is a moving object or an area to be combined is very small or suchlike, then rather than the image to be combined being used, processing is continued from alignment of the next image in the sequence.

If it is distinguished that the creation of the combination map is a failure, the result of the distinction in step S56 is negative, the processing returns to step S51, and the subsequent processing is repeated.

If it is distinguished that the creation of the combination map is successful, the result of the distinction in step S56 is affirmative and the processing advances to step S57.

In step S57, the combination map creation unit 112 adjusts the combination map in accordance with the focus position.

A method of adjustment is to find a level of importance of the image to be combined from the relationship between the AF position and the imaging focus position, and apply a weighting (for example, a gain) to the combination map.

Combination MAP'=Combination MAP×(gain corresponding to importance level)

In step S58, the alpha-blend unit 113 implements the combination by alpha-blending the image loaded in the output image storage memory Img_out with the image Img[i]' pixel by pixel, using the combination map.

That is, at each image combination, the combination is carried out such that edge strengths of a main object are reduced as little as possible, and the combination is carried out such that pixels with a higher likelihood of being in the main object are combined with the pixels of Img_out having higher combination ratios.

In step S59, the image combination unit 54 updates Img_out in the output image storage memory with the blended values. Thus, data of an omnifocal image is combined.

In step S60, the image combination unit 54 makes a distinction as to whether the processing has been completed for all the images.

If it is distinguished that the processing has not been completed for all the images, the result of the distinction in step S60 is negative, the processing returns to step S51, and the subsequent processing is repeated.

If it is distinguished that the processing has been completed for all the images, the result of the distinction in step S60 is affirmative and the image combination processing ends.

Now, of the omnifocal image creation processing in step S8, detailed flow of the combined image distinction processing of step S5 is described.

Figure 11:
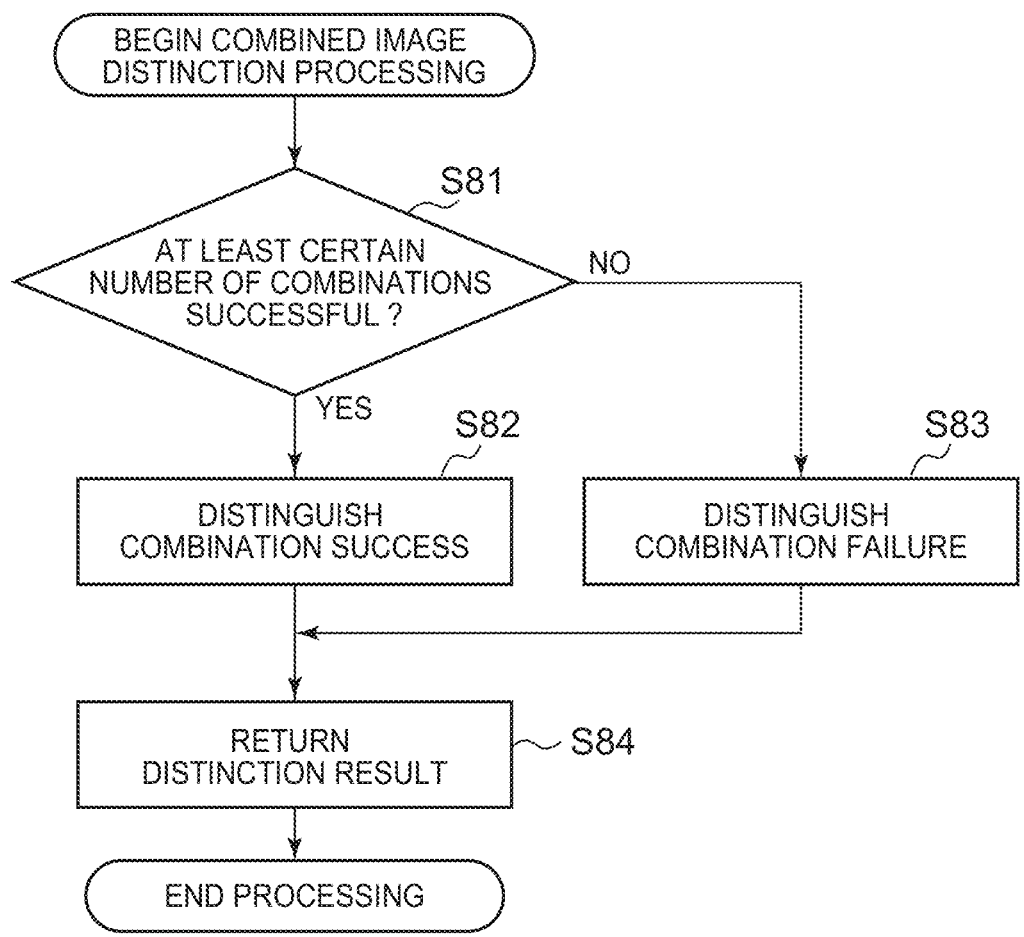
FIG. 11 is a flowchart describing details of the flow of combined image distinction processing in step S5 of the omnifocal image creation processing of FIG. 8.

FIG. 11 is a flowchart describing the detailed flow of the combined image distinction processing in step S5 of the omnifocal image creation processing of FIG. 8.

In step S81, the combined image distinction unit 114 makes a distinction as to whether at least a certain number of images could be combined. For example, the combined image distinction unit 114 makes a distinction as to whether the number of combined images is at least half the number of acquired images. The number for this distinction can be set in accordance with the depth of field of a lens that is used. The number may be set to be small when the depth of field is large and set to be large when the depth of field is small.

If it is distinguished that at least the certain number of images have not been combined, the result of the distinction in step S81 is negative and the processing advances to step S83. Step S83 is described below.

If it is distinguished that at least the certain number of images could be combined, the result of the distinction in step S81 is affirmative and the processing advances to step S82.

In step S82, the combined image distinction unit 114 distinguishes that the combining of the omnifocal image has been successful. That is, success in the combining of the omnifocal image means that one composite image (combined image) has been created.

In step S83, the combined image distinction unit 114 distinguishes that the combining of the omnifocal image has failed.

In step S84, the distinction result output unit 115 outputs the distinction of the combination result from step S82 or step S83. Thereafter, the combined image distinction processing ends.

According to the imaging apparatus 1 as described above, the lens driving unit 43, the imaging unit 16, the captured image acquisition unit 52, the combination sequence determination unit 53 and the image combination unit 54 are provided. The imaging apparatus 1 combines a plurality of captured images that are imaged with the focus position being moved.

The lens driving unit 43 changes the focus position.

The imaging unit 16 carries out imaging at the plurality of focus positions.

The captured image acquisition unit 52 acquires the data of the plurality of captured images that have been imaged at the plurality of focus positions.

From the data of the plurality of captured images acquired by the captured image acquisition unit 52, the combination sequence determination unit 53 determines a sequence of combination of the images imaged by the imaging unit 16, which is different from both a progressive sequence of focus distances and the sequence of imaging.

The image combination unit 54 combines the plurality of captured images imaged by the imaging unit 16, in the order determined by the combination sequence determination unit 53, creating data of an omnifocal image.

Thus, in the imaging apparatus 1, the plurality of captured images imaged by the imaging unit 16 are combined in a sequence determined by the combination sequence determination unit 53 and omnifocal image data is created.

Thus, the imaging apparatus 1 may create an omnifocal image in which the whole image is distinct.

The combination sequence determination unit 53 specifies a reference image to be a reference for combination by the image combination unit 54.

Therefore, in the imaging apparatus 1, an image reflecting, for example, the intentions of a user is specified as the reference image, and combination with reference to an object whose imaging was intended by the user is possible. Thus, an omnifocal image that is more distinct as a whole, with the emphasis on the reference image, may be created.

The combination sequence determination unit 53 alters the sequence of combination on the basis of relationships between the focus positions of the captured images acquired by the captured image acquisition unit 52 and the focus position of the reference image.

Thus, in the imaging apparatus 1, a sequence for combining captured images with few false edges and differing edge strengths may be determined. Thus, an omnifocal image that is more distinct as a whole may be created.

The combination sequence determination unit 53 determines that the captured image imaged at the focus position closest to infinity is the last in the sequence to be combined.

Thus, in the imaging apparatus 1, the captured image imaged at the focus position closest to infinity, which has the fewest false edges and the strongest edge strengths, may be combined last. Thus, an omnifocal image that is more distinct as a whole may be created.

The combination sequence determination unit 53 determines the combination sequence of the captured images to be a sequence of the focus positions of the captured images in the direction from the focus position of the reference position image toward the shortest imaging distance side of the lens provided at the imaging apparatus 1, and then in the direction from the focus position of the reference image toward infinity.

Therefore, in the imaging apparatus 1, captured images with fewer false edges and stronger edge strengths may be combined later. Thus, an omnifocal image that is more distinct as a whole may be created.

The image combination unit 54 aligns the data of the plurality of captured images while combining the same to create the omnifocal image data.

Thus, an omnifocal image that is more distinct as a whole may be created even if there is some amount of movement in the objects, blurring caused by the hand or the like.

The imaging apparatus 1 is further provided with the combined image distinction unit 114 and the distinction result output unit 115.

The combined image distinction unit 114 distinguishes whether combinations, other than that of the captured image imaged at the focus position closest to infinity, are successful.

The distinction result output unit 115 outputs whether the combining has been successful in accordance with a number of combination successes specified by the combined image distinction unit 114.

Thus, in the imaging apparatus 1, because the number of combinations when images other than the captured image imaged at the focus position closest to infinity are combined strongly affects combination results, a determination of whether or not the combining is successful can be carried out appropriately.

The alignment unit 111 distinguishes whether or not a combination is successful by determining whether or not a positional offset at the time of combination by the image combination unit 54 exceeds a pre-specified threshold.

Thus, in the imaging apparatus 1, whether or not a combination is successful may be distinguished by a simple method.

The alignment unit 111 determines whether or not a combination is successful on the basis of a depth map created from the captured images to be combined.

Thus, in the imaging apparatus 1, whether or not a combination is successful may be determined by a simple method.

It should be noted that the present invention is not limited to the embodiments described above, and any modifications and improvements thereto within a scope that can realize the object of the present invention are included in the present invention.

In the embodiment described above, an imaging order is changed to a suitable combination order on the basis of focusing positions to create an omnifocal image, but this is not limiting. For example, rather than altering the sequence of images at the time of combination, imaging may be controlled at the time of imaging such that the imaging proceeds through focus positions with a view to combination.

Further, in the embodiment described above, whether to use an image at infinity, whether the combined image is constituted with a predetermined number of images, and whether or not the combined image is suitable are determined in the combination image distinction processing, but this is not limiting. For example, degrees of focusing of objects in the combined image may be determined from edge strengths and the like in the combined image, and it may be determined whether or not the combined image is suitable by specifying regions with false edges from the degrees of focusing, or the like.

Further, in the embodiment described above, images are combined by alpha-blending, but this is not limiting. For example, a combination of images may use various methods such as addition combination or the like, provided that in-focus regions of the two images may be combined.

Further, in the embodiment described above, the plurality of captured images with different focus positions are imaged and then a suitable combination order is altered and combination is carried out. However, a suitable combination order may be defined and then the imaging may be performed in accordance with this combination order.

Further, in the combination order in this case, first, the focusing lens of the optical lens unit 41 is driven by the lens driving unit 43 on the basis of the results of autofocus processing by the CPU 11 and imaging is performed at the focusing position of a main object to be a reference. Then, the focusing lens of the optical lens unit 41 is driven by the lens driving unit 43 from the focusing position of the reference main object and moved to focus positions in the direction toward the shortest imaging distance side, and imaging is carried out in this sequence. Hence, imaging is carried out in a sequence in the direction from the reference focus position toward infinity, and finally imaging is carried out at a focus position closest to infinity. Processing methods corresponding to the steps from step S4 of FIG. 8 onward, meaning the image combination processing and the image combination distinction processing after the imaging of the plurality of images, are not particularly limited, but may correspond with the embodiment described above.

In the embodiment described above, an example in which the imaging apparatus 1 in which the present invention is employed is a digital camera is described, but this is not a particular limitation. The present invention is also applicable to image processing apparatuses that do not include imaging functions but perform omnifocal image creation processing on the basis of images imaged externally.

For example, the present invention may be generally applied to electronic apparatuses with omnifocal image creation processing functions. Specifically, the present invention is applicable to, for example, notebook computers, printers, television sets, video cameras, portable navigation apparatuses, portable telephones, portable video game machines and so forth.

The processing sequence described above can be executed by hardware, and can also be executed by software.

In other words, the hardware configuration shown in FIG. 5 is merely an illustrative example, and the present invention is not particularly limited thereto. More specifically, the types of functional blocks employed to realize the above-described functions are not particularly limited to the example of FIG. 5, so long as the image capturing apparatus 1 can be provided with the functions enabling the aforementioned processing sequence to be executed in its entirety.

A single functional block may be configured by a single piece of hardware, a single installation of software, or any combination thereof.

In a case in which the processing sequence is to be executed by software, a program configuring the software is installed from a network or a storage medium into a computer or the like.

The computer may be a computer embedded in dedicated hardware. Alternatively, the computer may be a computer capable of executing various functions by installing various programs, e.g., a general-purpose personal computer.

As well as the removable medium 31 in FIG. 4 that is distributed separately from the main body of the equipment for supplying the program to users, a recording medium containing such a program may be constituted by a recording medium that is supplied to users in a state of being incorporated in the main body of the equipment. The removable medium 31 is constituted by, for example, a magnetic disc (such as a floppy disk), an optical disc, a magneto-optical disc or the like. The optical disk is composed of a CD-ROM (Compact Disc-Read Only Memory), a DVD (Digital Versatile Disc), or the like, for example. The magneto-optical disk is composed of an MD (Mini-Disk) or the like. A recording medium that is supplied to users in a state of being incorporated in the main body of the equipment is constituted by, for example, the ROM 12 of FIG. 4, in which the program is saved, a hard disc included in the memory unit 19 of FIG. 4, or the like.

It should be noted that the steps in the present specification describing the program recorded in the storage medium include not only processing executed in a time series following this sequence, but also processing that is not necessarily executed in a time series but is executed in parallel or individually.

A number of embodiments of the present invention are explained hereabove. These embodiments are merely examples and do not limit the technical scope of the invention. The present invention may be attained by numerous other embodiments, and numerous modifications such as omissions, substitutions and the like are possible within a technical scope not departing from the spirit of the invention. These embodiments and modifications are to be encompassed by the scope and gist of the invention recited in the present specification, etc., and are encompassed by the inventions recited in the attached claims and their equivalents.

While the present invention has been described with reference to the preferred embodiments, it is intended that the invention be not limited by any of the details of the description therein but includes all the embodiments which fall within the scope of the appended claims.

What is claimed is:

1. An image processing apparatus comprising a CPU, wherein the CPU is operable as:
   an image acquisition unit that acquires data of a plurality of captured images that are imaged at a plurality of focus positions;
   a sequence determination unit that determines a sequence of combination for combining data of a plurality of the captured images, the sequence of combination being different from both (i) a progressive sequence of focus distances and (ii) a sequence of imaging;
   a reference image specification unit that specifies a reference image to be a reference for combining; and
   a combination unit that, based on the reference image specified by the reference image specification unit, combines the data of the plurality of the captured images in the sequence of combination determined by the sequence determination unit, and creates data of an omnifocal image,
   wherein the sequence determination unit alters the sequence of combination based on relationships between focus positions of the captured images acquired by the image acquisition unit and a focus position of the reference image.

2. The image processing apparatus according to claim 1, wherein the sequence determination unit determines that a captured image that is imaged at a focus position closest to infinity is last in the sequence of combination.

3. The image processing apparatus according to claim 1, wherein the sequence determination unit determines the sequence of combination of the captured images in accordance with a sequence of the focus positions of the captured images in a direction from the focus position of the reference image toward a side of a shortest imaging distance of a lens provided at the image processing apparatus, and then in a direction from the focus position of the reference image toward infinity.

4. The image processing apparatus according to claim 1, wherein the CPU is further operable as an imaging control unit that controls image acquisition by the image acquisition unit at the plurality of focus positions in a predetermined sequence as the sequence of imaging.

5. The image processing apparatus according to claim 4, wherein the CPU is further operable as a reference focus position specification unit that specifies a focus position at which a main object is in focus to be a reference for determining the sequence of imaging.

6. The image processing apparatus according to claim 5, wherein the sequence of imaging is a sequence in a direction from the reference focus position specified by the reference focus position specification unit toward a side of a shortest imaging distance of a lens provided at the image processing apparatus, and then in a direction from the reference focus position toward infinity.

7. The image processing apparatus according to claim 4, wherein a focus position closest to infinity is last in the sequence of imaging.

8. The image processing apparatus according to claim 1, wherein the combination unit aligns the data of the plurality of the captured images while combining the data and creating the data of the omnifocal image.

9. The image processing apparatus according to claim 1, wherein the CPU is further operable as:
   a distinction unit that distinguishes whether combinations are successful, other than a combination of a captured image imaged at a focus position closest to infinity; and
   a combination acceptability output unit that outputs whether or not the combining is successful in accordance with a number of successes in the combinations distinguished by the distinction unit.

10. The image processing apparatus according to claim 9, wherein the distinction unit distinguishes whether a combination is successful based on a depth map created from the captured image that is being combined.

11. The image processing apparatus according to claim 1, wherein the CPU is further operable as a focusing unit that controls altering of the focus position; and wherein the image processing apparatus further comprises an imaging unit that carries out imaging at the plurality of focus positions.

12. An image processing method comprising:

acquiring data of a plurality of captured images that are imaged at a plurality of focus positions;

determining a sequence of combination for combining data of a plurality of the captured images, the sequence of combination being different from both (i) a progressive sequence of focus distances and (ii) a sequence of imaging;

combining the data of the plurality of the captured images in the sequence of combination determined by the sequence determination unit, and creating data of an omnifocal image;

distinguishing whether combinations are successful, other than a combination of a captured image imaged at a focus position closest to infinity; and outputting whether or not the combining is successful in accordance with a number of successes in the combinations distinguished by the distinguishing, wherein the distinguishing distinguishes whether a combination is successful by distinguishing whether or not a positional offset at a time of combination by the combining exceeds a pre-specified threshold.

13. The method according to claim 12, wherein the distinguishing distinguishes whether a combination is successful based on a depth map created from the captured image that is being combined.

14. An image processing method comprising:

acquiring data of a plurality of captured images that are imaged at a plurality of focus positions;

determining a sequence of combination for combining data of a plurality of the captured images, the sequence of combination being different from both (i) a progressive sequence of focus distances and (ii) a sequence of imaging;

specifying a reference image to be a reference for combining; and combining, based on the reference image, the data of the plurality of the captured images in the sequence determined in the determining, and creating data of an omnifocal image, wherein the determining alters the sequence of combination based on relationships between focus positions of the captured images and a focus position of the reference image.

* * * * *